UNITED STATES PATENT OFFICE

FRANZ SCHÜRMEYER, OF BUER-RESSE, GERMANY, ASSIGNOR TO THE FIRM MINIMAX ACT.-GES., OF BERLIN, GERMANY

PRECIPITATION OF DUST

No Drawing. Application filed June 14, 1929, Serial No. 371,062, and in Germany June 16, 1928.

My invention reates to improvements in the precipitation of dust, and more particularly to a process of rendering harmless the dust developed by rock drilling machines. Since this dust is very detrimental to the health, various proposals have been made to bind it or to render it harmless, without having arrived at a satisfactory solution of the problem. I have now found that the dust developed when drilling stone may be preferably bound by means of foam. The process according to my invention for rendering harmless the dust developed by rock drilling machines consists in placing or stuffing foam preferably in front of the bore hole, and introducing foam into the latter, if necessary. Said foam may be produced by any well known process, for instance by chemical means. Preferably, however, a foam should be employed which is manufactured from a foam-forming liquid and a gas or a gas mixture under pressure, more particularly compressed air. Such a foam, and in particular a foam produced by the aid of air retains the liquid contained in it for a long time and is therefore practically dry, which is very important, because at certain points of the workings wet foam formation processes are not applicable.

Such an air containing foam may for instance be produced by introducing into a receptacle containing the foam forming liquid compressed air in a state of fine division, by, for example, forcing compressed air through a porous body, such as a filter body of ceramic material, wetted with the liquid. Another suitable process consists in forcing a foam forming liquid together with compressed air through a porous body. It will be understood, however, that for carrying out my process all other known apparatus is suitable, by the aid of which foam may be produced by mechanical means by employing compressed air or compressed gas. In comparison with the use of a foam produced by chemical means the application of air foam has the further advantage, that besides the piping, in the most cases already present for conveying the compressed air to the drilling machine, no other pipes need b passed to the working place. For this reason the use of air foam is very economical. The apparatus for the mechanical production of foam by using compressed air or compressed gas or a mixture of gases under pressure is, furthermore, easy to handle, reliable, safe and durable in operation.

I claim as my invention:

1. The process of rendering harmless the dust developed by rock drilling machines which consists in stuffing the drill hole during drilling operations with foam to prevent the dust from leaving the drill hole.

2. The process of rendering harmless the dust developed by rock drilling machines which consists in producing a foam from a foam-forming liquid and a gas and stuffing a drill hole during drilling operations with said foam.

3. The process of rendering harmless the dust developed by rock drilling machines which consists in producing a foam from a foam-forming liquid and a gas mixture and stuffing a drill hole during drilling operations with said foam.

4. The process of rendering harmless the dust developed by rock drilling machines which consists in producing a foam from a foam-forming liquid and air and stuffing a drill hole during drilling operations with said foam.

5. The process of rendering harmless the dust developed by rock drilling machines which consists in producing a foam by passing a foam-forming liquid and air through a porous body and stuffing a drill hole during drilling operations with said foam.

FRANZ SCHÜRMEYER.